United States Patent
Kuwabara et al.

(10) Patent No.: US 9,146,326 B2
(45) Date of Patent: Sep. 29, 2015

(54) RADIOGRAPHIC IMAGE DETECTOR AND CONTROL METHOD THEREFOR

(75) Inventors: Takeshi Kuwabara, Kanagawa (JP); Keita Watanabe, Kanagawa (JP); Jun Enomoto, Kanagawa (JP); Yasufumi Oda, Kanagawa (JP); Takeshi Koishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 373 days.

(21) Appl. No.: 13/480,157

(22) Filed: May 24, 2012

(65) Prior Publication Data

US 2012/0305792 A1 Dec. 6, 2012

(30) Foreign Application Priority Data

May 30, 2011 (JP) ................................ 2011-120658

(51) Int. Cl.
*G01N 23/04* (2006.01)
*G01T 1/24* (2006.01)
*G01T 1/17* (2006.01)
*G01T 1/20* (2006.01)

(52) U.S. Cl.
CPC . *G01T 1/243* (2013.01); *G01T 1/17* (2013.01); *G01T 1/2018* (2013.01)

(58) Field of Classification Search
CPC ............. G01T 1/105; G01T 1/15; G01T 1/24; G01T 1/2942
USPC ........... 250/394, 390.09, 370.08, 366, 363.02
See application file for complete search history.

(56) References Cited

U.S. PATENT DOCUMENTS

| 3,268,728 | A | * | 8/1966 | Stoddart et al. ................ 250/303 |
| 4,605,859 | A | * | 8/1986 | DiIanni et al. ................ 250/374 |
| 4,631,411 | A | * | 12/1986 | Noback .......................... 250/374 |
| 5,530,238 | A | * | 6/1996 | Meulenbrugge et al. .. 250/208.1 |
| 5,818,898 | A | * | 10/1998 | Tsukamoto et al. ......... 378/98.8 |
| 5,962,857 | A | * | 10/1999 | McKeever et al. ......... 250/484.5 |
| 6,035,013 | A | * | 3/2000 | Orava et al. .................... 378/37 |
| 6,239,439 | B1 | * | 5/2001 | Itabashi et al. ........... 250/370.11 |

(Continued)

FOREIGN PATENT DOCUMENTS

| JP | 2002-165142 A | 6/2002 |
| JP | 2005-143802 A | 6/2005 |

(Continued)

OTHER PUBLICATIONS

Machine Translation of JP 2005-143802 A.*

(Continued)

*Primary Examiner* — David Porta
*Assistant Examiner* — Djura Malevic
(74) *Attorney, Agent, or Firm* — Studebaker & Brackett PC

(57) ABSTRACT

An x-ray image detector monitors the intensity of incident x-rays to detect an end of radiation from an x-ray source when the x-ray intensity decreases to a threshold level or less. The x-ray intensity gets down to zero with a variable time lag from the start of decreasing, called radiation wave tail. Depending on the gradient of declivity in time curve of the decreasing x-ray intensity, calculated at the time when the end of radiation is detected, the x-ray image detector decides a delay time from the end-of-radiation detection time to a reading start time to start reading signal charges from the image detector. Thus, the reading start time may be adjusted to the point when the x-ray intensity gets down to zero, which will improve S/N ratio and prevent shading artifacts.

14 Claims, 10 Drawing Sheets

(56) References Cited

U.S. PATENT DOCUMENTS

| | | | |
|---|---|---|---|
| 6,403,964 B1* | 6/2002 | Kyyhkynen | 250/370.09 |
| 6,429,436 B1* | 8/2002 | Tomisaki et al. | 250/370.09 |
| 6,596,998 B1* | 7/2003 | Siedel | 250/370.1 |
| 6,671,394 B1* | 12/2003 | Sako | 382/132 |
| 6,801,598 B2* | 10/2004 | Tashiro et al. | 378/98.8 |
| 7,079,189 B2* | 7/2006 | Tsujii et al. | 348/372 |
| 7,495,224 B2* | 2/2009 | Widener et al. | 250/370.07 |
| 7,723,696 B2* | 5/2010 | Shirakawa et al. | 250/395 |
| 2002/0044211 A1* | 4/2002 | Tujii et al. | 348/302 |
| 2003/0030004 A1* | 2/2003 | Dixon et al. | 250/370.09 |
| 2004/0046879 A1* | 3/2004 | Ohzu et al. | 348/243 |
| 2004/0256567 A1* | 12/2004 | Nokita | 250/370.08 |
| 2006/0056581 A1* | 3/2006 | Hoffman et al. | 378/19 |
| 2008/0029688 A1* | 2/2008 | Yagi et al. | 250/208.1 |
| 2008/0240339 A1* | 10/2008 | Du et al. | 378/5 |
| 2008/0272305 A1* | 11/2008 | Shirakawa et al. | 250/371 |
| 2009/0026379 A1* | 1/2009 | Yaegashi et al. | 250/370.09 |
| 2009/0127469 A1* | 5/2009 | Widener et al. | 250/370.07 |
| 2010/0078583 A1* | 4/2010 | Tsubota et al. | 250/580 |
| 2010/0181491 A1* | 7/2010 | Karim et al. | 250/394 |
| 2010/0246770 A1* | 9/2010 | Niwa | 378/98 |

FOREIGN PATENT DOCUMENTS

| | | |
|---|---|---|
| JP | 2010-214056 A | 9/2010 |
| JP | 2010-264181 A | 11/2010 |

OTHER PUBLICATIONS

Machine Translation of JP 2010-214056 A.*

Japanese Office Action "Notificaion of Reasons for Refusal" dated Apr. 24, 2013, which corresponds to Japanese Patent Application No. 2011-120658 and is related to U.S. Appl. No. 13/480,157 with translation.

The first Office Action issued by the State Intellectual Property Office of People's Republic of China on Sep. 28, 2014, which corresponds to Chinese Patent Application No. 201210174696.0 and is related to U.S. Appl. No. 13/480,157; with English language translation.

The second Office Action issued by the State Intellectual Property Office of People's Republic of China on Apr. 29, 2015, which corresponds to Chinese Patent Application No. 201210174696.0 and is related to U.S. Appl. No. 13/480,157; with English language translation.

* cited by examiner

RADIOGRAPHIC IMAGE DETECTOR AND CONTROL METHOD THEREFOR

BACKGROUND OF THE INVENTION

1. Field of the Invention

The present invention relates to a radiographic image detector and a control method for the radiographic image detector.

2. Description of the Related Art

In medical field, radiography systems utilizing radioactive rays such as x-rays for imaging are known. An x-ray radiography system includes an x-ray projector having an x-ray source for projecting x-rays toward a subject, an object to be imaged, and a radiographic image detector that receives x-rays from the x-ray projector after penetrating the subject, thereby to acquire a radiograph or x-ray image that represents information on the subject. The x-ray source will project x-rays under given image acquisition settings. The image acquisition settings include tube current that decides the amount of x-ray dose per unit time, and tube voltage that decides the quality of x-rays, i.e. the energy spectrum of the x-rays. These image acquisition settings are determined for each test subject according to demands and conditions of the subject to be imaged, such as the target site to be inspected, the age of the subject when it is a patient, etc.

As the radiographic image detector, those using a flat panel detector (FPD) in place of conventional x-ray film or a radiographic imaging plate (IP) have been adopted in practice. As described for example in JPA 2010-264181, the FPD includes a detection panel having a large number of pixels arranged in a matrix in an imaging area. The pixels accumulate signal charges corresponding to the amounts of x-rays incident on the respective pixels, and a signal processing circuit of the FPD reads out the signal charges from the pixels to output the signal charges as an analog voltage signal.

The detection panel includes numbers of pixels or detection elements in an imaging area, each pixel including a photodiode and a thin film transistor (TFT), and a scintillator (a phosphorous member) for converting x-rays to visible light is provided on the imaging area. The TFT is a switching element for switching an electric connection between the photodiode and a signal line on and off to change over operation modes of the pixel. When the TFT is turned off, the photodiode is electrically disconnected from the signal line, so that the photodiode begins to accumulate signal charges. When the TFT is turned on, the photodiode is electrically connected to the signal line, so that the signal charges generated in the photodiode are read out through the TFT and the signal line.

Unlike the conventional x-ray film or imaging plate, the TFTs of the FPD must be turned on or off to start accumulating or reading the signal charges in synchronism with the radiation timing from the x-ray source. To control the FPD synchronously with the x-ray source, a synchronizing signal may be transmitted from the x-ray source to the FPD. Alternatively, as disclosed in JPA 2010-264181, the FPD may automatically detect the start and stop of x-ray radiation based on the intensity of x-rays incident on the FPD, radiation doses per unit time. As the timing of radiation from the x-ray source being detected by the FPD without any communication between the x-ray source and the FPD, the FPD does not need to mount any communication interface for the x-ray source, which allows simplifying the structure of the FPD. Subsequently, any hardware relating to the communication interface, such as cables, terminals, and substrates, may also be omitted. Therefore, the FPD that can detect the radiation timing by itself may also save the cost of the radiographic image detector as the whole.

As illustrated in FIG. 12 of the above prior art, the x-ray intensity begins to increase gradually upon a start command received on the x-ray source, and reaches a peak level that is determined by the tube current. Thereafter, the x-ray intensity is kept at a substantially constant level around the peak level till the x-ray source receives a stop command. Upon the stop command, the x-ray intensity begins to decrease gradually. Therefore, the intensity of x-rays dosed for one image acquisition changes along an approximately trapezoidal time curve.

According to the above prior art, the FPD measures the x-ray intensity as a voltage signal and detects the end of radiation when the voltage gets below a certain threshold level, or when the time derivative of the voltage gets above a certain negative threshold level, i.e. when the gradient of a declivity in a time curve that represents the decreasing x-ray intensity with time gets greater than a predetermined value. Immediately after the end of radiation is detected, the TFTs are turned on to terminate the charge accumulating operation and start the charge reading operation.

However, starting the reading operation at a constant timing from the time of detection of the end of radiation, like in the above prior art, has a problem as set forth below.

Generally the response of the x-ray source to the stop command is so slow that there is a certain time lag between the start of declination of x-ray intensity upon the stop command and the complete stop of radiation, i.e. when the x-ray intensity becomes zero. Hereinafter, the time lag from when the x-ray intensity begins to decrease till it gets down to zero may be referred to as the duration of a radiation wave tail in a time curve representing the course of x-ray intensity along time. The duration of radiation wave tail varies depending upon the tube voltage applied for activating the x-ray source. When the tube voltage is low, the x-ray intensity will decrease more rapidly after the stop command; the radiation wave tail will have a steeper declivity and hence the duration of the radiation wave tail is relatively short. On the other hand, when the tube voltage is high, the x-ray intensity will decrease more slowly after the stop command; the radiation wave tail will have a gentler declivity and hence the duration of the radiation wave tail is relatively long.

As the tube voltage differs from one imaging session to another, the duration of radiation wave tail may vary correspondingly. If the reading operation is predetermined to start in a constant time after an end of radiation detected, the reading start time tends to unexpectedly deviate from the time when the radiation completely stops. For instance, if the time from the detection of end-of-radiation to the start of reading operation is fixedly adjusted to a short radiation wave tail at a low tube voltage, the reading operation will start before the complete end of radiation when the tube voltage is higher and the radiation wave tail lasts longer. To the contrast, if the time from the detection of end-of-radiation to the start of reading operation is fixedly adjusted to a long radiation wave tail at a high tube voltage, the reading operation will start with a certain delay from the complete end of radiation when the tube voltage is lower and the radiation wave tail ends shorter.

Since the pixels are still irradiated with x-rays during the radiation wave tail, indeed the x-ray intensity gradually decreases, if the accumulating operation is terminated to start the reading operation before the complete end of radiation, those x-rays radiated after the end of accumulating operation will not be utilized for image signal acquisition. The waste of radiation may lower the S/N ratio of the image.

Moreover, starting the reading operation before the end of radiation wave tail may cause shading artifact. Shading artifact appears as density gradations increasing in one direction within the image. Since the signal charges are read out from the pixels line after line to get a frame of image, there is a time lag from the reading operation of the first pixel line to the reading operation of the last pixel line. Accordingly, the pixels of the last line can accumulate charges for a longer time than the pixels of the first line. As a result, if the pixels are irradiated with x-rays during the reading operation, the accumulated charges will increase in ascending order of pixel lines, so will the image density distribute. Thus, shading artifact appears in the image, increasing image density gradually in the charge reading direction, i.e. in one column direction orthogonal to the line direction of the pixels.

On the other hand, the photodiodes generate dark currents even while they are not irradiated with x-rays. Therefore, if the accumulating operation is continued after the complete end of radiation, i.e. without any x-ray irradiation, the dark current noise will increase in the image signal, which may also lower the S/N ratio of the consequent image.

For the reasons as above, for the benefit of image S/N ratio improvement, the reading start time should ideally be coincident with the end of radiation wave tail when the x-ray intensity gets down to zero. In order to start the reading operation at the end of radiation wave tail, the threshold level of the x-ray intensity used for detecting the end of radiation may be set as low as substantially zero. However, as described above, because of the risk of detection error due to dark current from the photodiodes, it is hard to adopt such a low threshold level for detecting the end of radiation. The above-mentioned prior art does not disclose nor imply the above problems and solutions therefor.

SUMMARY OF THE INVENTION

In view of the foregoing, an object of the present invention is to provide a solution for acquiring high S/N ratio radiographic images in spite of the variable duration of the radiation wave tail.

According to the present invention, a radiographic image detector for detecting a radiographic image from radioactive rays projected from a radiation source includes:

an imaging device having pixels arrayed in a matrix, each pixel generating an electric signal corresponding to the amount of radioactive ray incident on the pixel;

a measuring device measuring radiation intensity that represents radiation dose per unit time of incident radioactive rays from the radiation source;

a detection device detecting an end of radiation from the radiation source on determining that the measured radiation intensity began to decrease;

a timing device for deciding time to start a reading operation for reading out the electric signals from the pixels as radiographic image data, on the basis of a gradient of a declivity in time curve of the radiation intensity decreasing in the end of radiation; and a control device for controlling an imaging device to stop accumulating the electric signals and start the reading operation at the time decided by the timing device after the end of radiation is detected by the detection device.

Preferably, the timing device may calculate the gradient of the declivity in the time curve from the radiation intensity measured by the measuring device, and decide the time to start the reading operation depending on the calculated gradient.

More preferably, the timing device calculates the gradient of the declivity in the time curve at an end-of-radiation detection time when the detection device detects the end of radiation.

The detection device may preferably determine that the radiation intensity began to decrease when the measured radiation intensity decreases to a first threshold level or less.

In a preferred embodiment, the timing device may decide a delay time from the end-of-radiation detection time to the time to start the reading operation depending on the gradient. In this embodiment, the control device controls the imaging device to start the reading operation when the delay time has elapsed since the end-of-radiation detection time.

In another preferred embodiment, the timing device may decide a second threshold level lower than the first threshold level depending on the gradient. In this embodiment, the control device controls the imaging device to start the reading operation when the radiation intensity decreases to the second threshold level or less.

The timing device may preferably adjust the delay time or the second threshold level on the basis of total radiation dose or peak intensity of the incident radioactive rays.

In an alternative, the timing device may also estimate the gradient of the declivity in the time curve of the radiation intensity from information that correlates with the gradient of the declivity in the time curve of the radiation intensity, and decides the time to start the reading operation on the basis of the estimated gradient.

The information correlating with the gradient of the declivity in the time curve may be a gradient of an acclivity in time curve of the radiation intensity increasing as the radiation source starts radiation.

The information correlating with the gradient of the declivity in the time curve may also be information on tube voltage applied for activating the radiation source.

Preferably, the pixels of the imaging device include at least a short-circuited pixel that is kept electrically connected to a signal line for reading out the electric signal from the pixel, and the measuring device monitors output level of the short-circuited pixel through the signal line to measure the radiation intensity.

In an embodiment, wherein two or more of the pixels are constructed as the short-circuited pixels connected to individual signal lines, the measuring device selects one signal line with the largest output level for measuring the radiation intensity from among those signal lines connected to the short-circuited pixels.

The present invention also provides a control method for a radiographic image detector for detecting a radiographic image from radioactive rays projected from a radiation source, the radiographic image detector having pixels arrayed in a matrix, each pixel accumulating an electric signal corresponding to the amount of radioactive ray incident on the pixel. The inventive method comprises the following steps:

measuring radiation intensity that represents radiation dose per unit time of the radioactive rays incident on the radiographic image detector;

determining whether the measured radiation intensity began to decrease or not;

detecting an end of radiation from the radiation source when it is determined that the measured radiation intensity began to decrease;

determining a gradient of a declivity in time curve of the radiation intensity decreasing in the end of radiation;

deciding on the basis of the gradient a reading start time to start reading the electric signals from the pixels; and stopping accumulating the electric signals in the pixels and starting reading the electric signals from the pixels at the decided reading start time.

According to the present invention, the reading start time to start reading electric signals from the pixels is decided depending on the gradient of declivity in time curve of the decreasing radiation intensity. Thus, the reading start time may be adjusted to the point when the x-ray intensity gets down to zero, which will prevent shading artifacts and improve S/N ratio of the acquired radiographic image.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

First Embodiment

Figure 1:
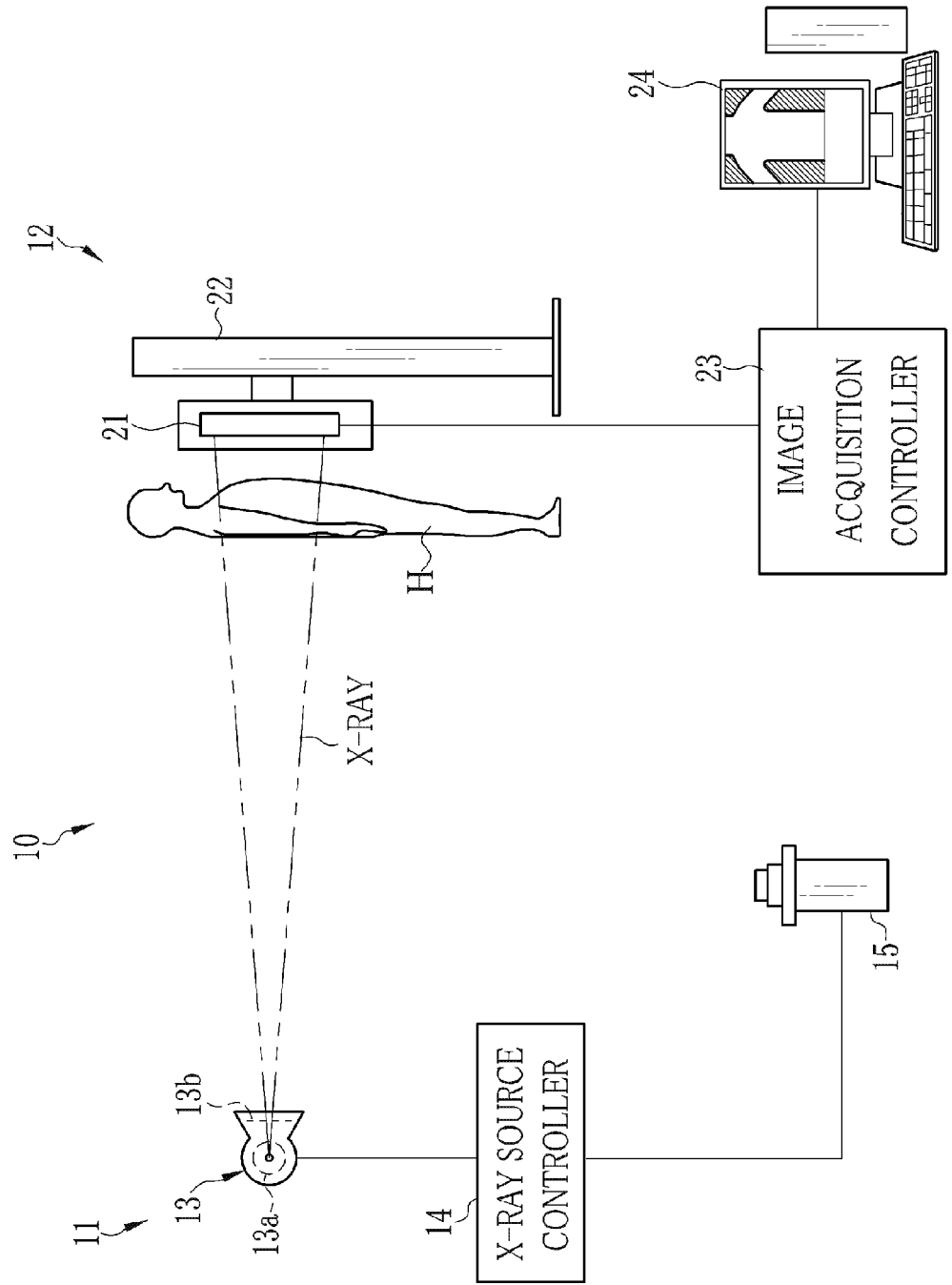
FIG. 1 is a diagram schematically illustrating an x-ray radiography system.

In FIG. 1, an x-ray radiography system 10 consists of an x-ray projector 11 and radiographic equipment 12. The x-ray projector 11 consists of an x-ray source 13, an x-ray source controller 14 for controlling the x-ray source 13, and an activator switch 15. The x-ray source 13 has an x-ray tube 13a for radiating x-rays and a collimator 13b for limiting the radiation field of x-rays from the x-ray tube 13a.

The x-ray tube 13a has a cathode which includes a filament for emitting thermions and an anode (target) against which the thermions strike to radiate x-rays. The collimator 13b may for example be made of lead plates shielding x-rays, which are put together in a double-cross formation to form a center aperture for letting x-rays pass through it. The lead plates are movable to change the size of the center aperture so as to limit the radiation field to a suitable range.

The x-ray source controller 14 includes a high voltage generator for supplying a high voltage to the x-ray source 13, and a controller for controlling tube voltage, tube current and x-ray irradiation time, wherein the tube voltage determines quality (energy spectrum) of x-rays from the x-ray source 13, and the tube current determines the radiation dose per unit time. The high voltage generator generates the high tube voltage by boosting an input voltage through a transducer, and supplies the tube voltage as the driving power to the x-ray source 13 through a high voltage cable. Image acquisition settings, such as tube voltage, tube current, and x-ray irradiation time, may be manually given by a radiologist or operator using an operation panel of the x-ray source controller 14.

The activator switch 15 is operated by the radiologist, and is connected to the x-ray source controller 14 through a signal cable. The activator switch 15 may be a two-step push button switch that outputs a warm-up start signal for staring warming up the x-ray source 13 upon being pushed to the first step, and then outputs a radiation start signal upon being pushed further to the second step, activating the x-ray source 13 to start radiation. These signals are fed through the signal cable to the x-ray source controller 14.

The x-ray source controller 14 controls the operation of the x-ray source 13 according to the control signals from the activator switch 15. Upon receipt of the radiation start signal from the activator switch 15, the x-ray source controller 14 starts supplying the power to the x-ray source 13, causing the x-ray source 13 to start radiation. With the start of power supply, the x-ray source controller 14 also activates r to start measuring the duration of the x-ray radiation. When an irradiation time given as one of exposure conditions is over, the x-ray source controller 14 controls the x-ray source 13 to stop radiation. The x-ray irradiation time varies depending upon other exposure conditions, but the maximum x-ray irradiation time for acquisition of a still image is mostly set in the range of about 500 msec. to about 2 sec. Therefore, the irradiation time is limited at most to the maximum irradiation time.

The radiographic equipment 12 consists of an electronic cassette 21, a radiographic stand 22, an image acquisition controller 23 and a console 24. The electronic cassette 21, an embodiment of the radiographic image detector in accordance with the invention, mainly consists of a flat panel detector (FPD) 36 (see FIG. 2) and a housing containing the FPD 36. The electronic cassette 21 is a portable x-ray image detector that receives x-rays from the x-ray source 13 that penetrate through a test subject or patient H, to detect an x-ray image or radiograph of the test subject H. The housing of the electronic cassette 21 has a flat planer body having substantially rectangular top and bottom surfaces. The plane size of the electronic cassette 21 is about the same as those of radiographic film cassettes and IP cassettes.

The radiographic stand 22 has a slot for detachably attaching the electronic cassette 21 and holding the cassette 21 in a position where an x-ray sensitive surface thereof is opposed to the x-ray source 13. Having the same size as the film cassettes and IP cassettes, the electronic cassette 21 can be mounted to those radiographic stands or tables which are adapted to the film cassettes or IP cassettes. It is to be noted that the radiography system 10 may also use a radiographic table for imaging the test subject H in the recumbent position in place of the radiographic stand 22 for imaging the test subject H in the upright position.

The image acquisition controller 23 is communicably connected to the electronic cassette 21 through wired or wireless communication devices, to control the electronic cassette 21. Specifically, the image acquisition controller 23 sends data of acquisition settings to the electronic cassette 21 to set up conditions for signal processing in the FPD 36, and receives a synchronizing signal from the x-ray projector 11 and transfers the signal to the electronic cassette 21, thereby to synchronize the FPD 36 with the x-ray source 13. The image acquisition controller 23 also receives image data output from the electronic cassette 21 and transmits the image data to the console 24.

The console 24 may receive examination orders, each including information on the sex and age of the patient, the target site of imaging, the purpose of imaging, etc., and display the received examination orders. The examination orders may be issued by external systems, such as a hospital information system (HIS) and a radiological information system (RIS), which manage information on patients and information on x-ray examinations. The examination orders may also be manually input by the operator or radiologist. Before executing the imaging, the radiologist inputs acquisition settings in the console 24 with reference to the contents of the designated examination order.

The console 24 transmits data of the input acquisition settings to the image acquisition controller 23 and receives radiographic data of x-ray images from the image acquisition controller 23. The console 24 processes the radiographic data for various image renderings, such as gamma correction and frequency enhancement. Based on the processed image data, x-ray images are displayed on a screen of the console 24. The processed radiographic image is also stored in a data storage device, such as a hard disc in the console 24 or an image database server that is communicably connected to the console 24 through a network.

Figure 2:
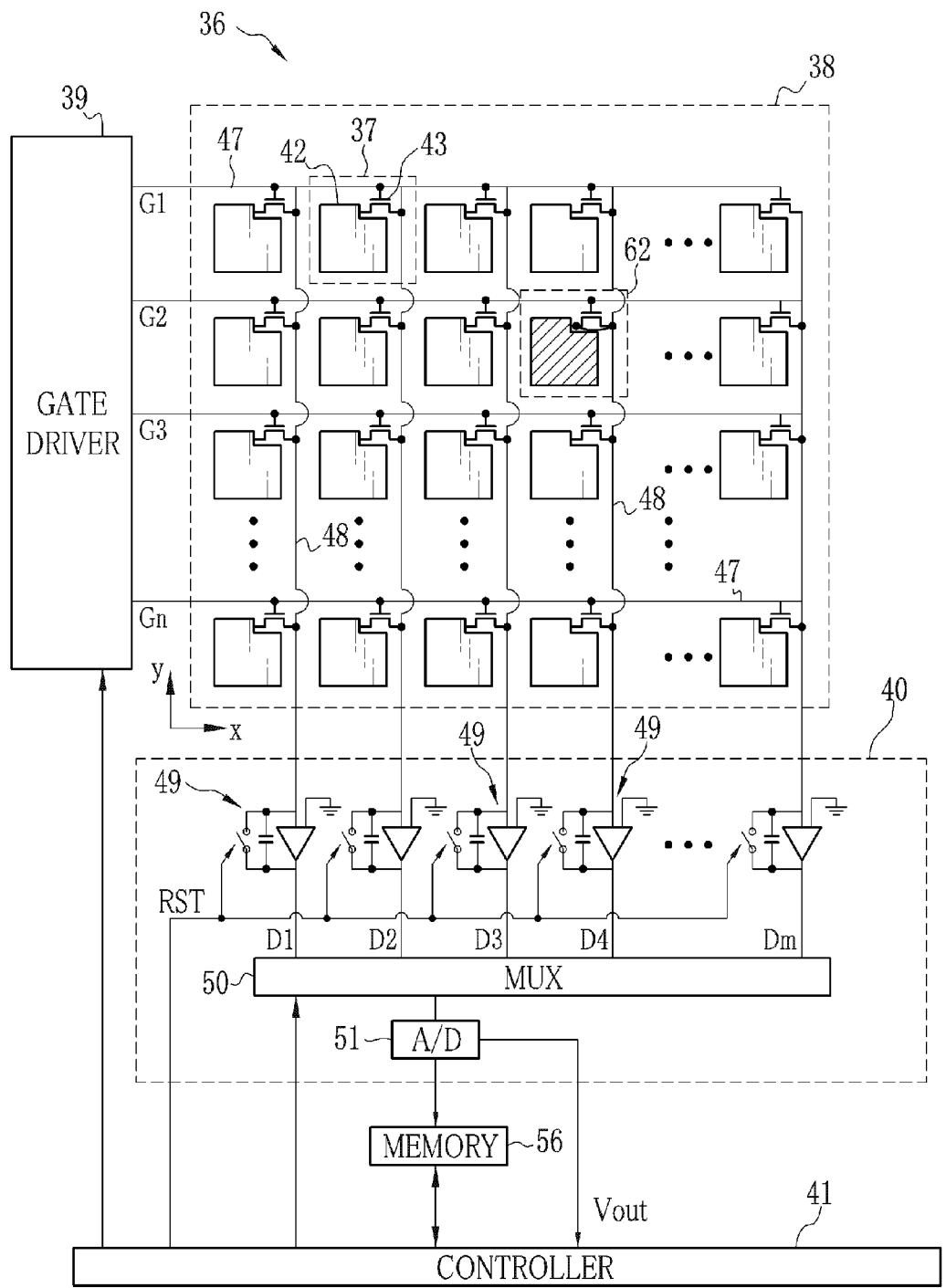
FIG. 2 is a circuit diagram illustrating an electric structure of a flat panel detector.

Referring to FIG. 2, the FPD 36 includes a detection panel 35, a gate driver 39, a signal processing circuit 40, and a control circuit 41. The detection panel 35 has a thin film transistor (TFT) active matrix substrate having an imaging area 38 formed thereon, in which pixels 37 for accumulating signal charges according to the incident amount of x-rays are arranged in a matrix (n-lines and m-columns) at predetermined intervals; the line direction and the column direction of the pixel matrix correspond to x-direction and y-direction of the imaging area 38, respectively. The gate driver 39 drives the pixels 37 to control reading of the signal charges. The signal processing circuit 40 converts the signal charges, as read from the pixels 37, to digital data and outputs the digital data. The control circuit 41 controls the gate driver 39 and the signal processing circuit 40 to control the operation of the FPD 36.

The FPD 36 may be of an indirect conversion type that has a not-shown scintillator for converting x-rays to visible rays and converts the visible rays to electric charges through the pixels 37. The scintillator is positioned to face to the whole imaging area 38. The scintillator is made of a phosphor such as cesium iodide (CsI) or gadolinium oxy sulfide (GOS). Note that the FPD 36 may be replaced with a direct conversion type flat panel detector using a conversion layer that converts x-rays directly to electric charges; the conversion layer may be made of amorphous selenium.

Each of the pixels 37 includes a photodiode 42, a not-shown capacitor, and a thin film transistor (TFT) 43. The photodiode 42 is a photoelectric conversion element that generates charges (pairs of electrons and holes) in response to incident visible light. The capacitor accumulates the charges generated from the photodiodes 42, and the TFT 43 serves as a switching element.

The photodiode 42 has a semiconductor layer, e.g. PIN-type amorphous silicon (a-Si) layer, and electrodes are provided on the top and bottom of the semiconductor layer. The photodiode 42 is connected at the lower electrode to the TFT 43 and at the upper electrode to a not-shown bias line.

Through the bias line, a bias voltage is applied to the upper electrodes of the photodiodes 42 of all pixels 37 in the imaging area 38. The applied bias voltage induces an electric field in the semiconductor layer of each photodiode 42. Due to the electric field, among the electric charges (pairs of electrons and holes) produced through the photoelectric conversion in the semiconductor layer, the electrons are moved to the upper electrode of positive polarity, and the holes to the lower electrode of negative polarity. As a result, charges are accumulated in the capacitors.

Each of the TFTs 43 is connected at its gate to a scanning line 47, at its source to a signal line 48, and at its drain to the photodiode 42. The scanning lines 47 and the signal lines 48 are interconnected into a grid. The scanning lines 47 are provided corresponding to the pixel lines (n-lines) of the imaging area 38 such that one scanning line 47 is connected to every pixel 37 of the corresponding pixel line. The signal lines 48 are provided corresponding to the pixel columns (m-columns) of the imaging area 38 such that one signal line 48 is connected to every pixel 37 of the corresponding column. The scanning lines 47 are respectively connected to the gate driver 39, whereas the signal lines 48 are respectively connected to the signal processing circuit 40.

The gate driver 39 drives the TFTs 43 to make an accumulating operation for accumulating the signal charges in the pixels 37, a reading operation for reading out the signal charges from the pixels 37, or a resetting operation for resetting the signal charges accumulated in the pixels 37. The control circuit 41 controls the timings when the gate driver 39 starts the above operations.

The accumulating operation is carried out by turning off the TFTs 43, and the signal charges are accumulated in the pixels 37. In the reading operation, the gate driver 39 sequentially outputs gate pulses G1 to Gn, one gate pulse to one scanning line 47, activating the pixel lines one after another, to drive the TFTs 43 of the activated line all at once. Thus, the TFTs 43 are turned on line by line.

When the TFTs 43 of one line are turned on, the signal charges accumulated in the pixels 37 of this line are fed through the respective signal lines 48 to the signal processing circuit 40. The signal charges of one line are converted to voltages through a voltage output circuit 55 in the signal processing circuit 40, as set forth in detail later. Output voltages corresponding to the respective signal charges are read out as analog voltage signals D1 to Dm. The analog voltage signals D1 to Dm are converted to digital image data that shows digital pixel levels representative of density levels of the respective pixels of one line. The image data is fed to a memory 56 that is built in the housing of the electronic cassette 21.

As well known in the art, dark currents will be generated in the semiconductor layers of the photodiodes 42 regardless of whether x-rays are incident in the photodiodes 42 or not. While the bias voltage is being applied, dark charges corresponding to the dark currents are accumulated in the capacitors. Because the dark charges are noises for the image data, the resetting operation is carried out to sweep off the dark charges from the pixels 37 through the signal lines 48.

The resetting operation may be executed for example in a line-sequential method resetting the pixels 39 line by line. According to the line-sequential resetting method, the gate driver 39 sequentially outputs the gate pulses G1 to Gn to the respective scanning lines 47, like in the reading operation, to turn on the TFTs 43 line by line. As the TFTs 42 are turned on, the dark charges accumulated in the pixels 37 are discharged through the signal lines 48 to the signal processing circuit 40.

In the resetting operation, unlike the reading operation, the signal processing circuit 40 does not output any voltage signal. Instead, the control circuit 41 outputs a reset pulse RST to the signal processing circuit 40 synchronously with each gate pulse G1 to Gn from the gate driver 39 in the resetting operation. The reset pulse RST turns on reset switches 49a of integrating amplifiers 49 of the signal processing circuit 40, resetting the input dark charges in the signal processing circuit 40, as set forth in detail below.

Alternatively, the resetting operation may be carried out in another method, such as a parallel resetting method or a total resetting method. In the parallel resetting method, the dark charges are swept out from several pixel lines in parallel to each other. In the total resetting method, the dark charges are swept out from all pixels at once. Therefore, the parallel setting method and the total resetting method will accelerate the resetting operation.

The signal processing circuit 40 includes the integrating amplifiers 49, a multiplexer (MUX) 50 and an A/D converter 51. The integrating amplifiers 49 are connected to the signal lines 48 in one-to-one relationship. Each integrating amplifier 49 consists of an operational amplifier and a capacitor connected between an input and an output of the operational amplifier. The signal line 48 is connected to the input of the operational amplifier. The operational amplifier has another input terminal that is grounded. The integrating amplifiers 49 integrate the signal charge s from the signal lines 48 to convert them to the voltage signals D1 to Dm.

In each column, an output terminal of the integrating amplifier 49 is connected through a not-shown amplifier for amplifying the voltage signal D1 to Dm and a not-shown sampling-and-holding circuit for holding the voltage signal D1 to Dm to the MUX 50. That is, the integrating amplifiers 49 are connected in parallel to the MUX 50. The MUX 50 sequentially selects one of the integrating amplifiers 49 after another to feed the voltage signals D1 to Dm from the integrating amplifiers 49 serially to the A/D converter 51. The A/D converter 51 converts the analog voltage signals D1 to Dm to digital pixel levels corresponding to their signal levels.

In the reading operation after the charge accumulating operation, the gate pulses G1 to Gn sequentially turn on the TFTs 43 line by line, feeding the signal charges from the capacitors of the pixels 37 of the activated line through the signal lines 48 to the integrating amplifiers 49.

When the voltage output circuit 55 outputs the voltage signals D1 to Dm for one line, the control circuit 41 outputs a reset pulse or reset signal RST to the integrating amplifiers 49 to turn on the reset switches 49a of the integrating amplifiers 49. Thereby, the signal charges for one line, accumulated in the integrating amplifiers 49, are reset to zero. Upon resetting the integrating amplifiers 49, the gate driver 39 outputs the gate pulse to the next line, starting reading the signal charges of the pixels 37 of the next line. These operations are sequentially repeated to read out the signal charges from the pixels 37 of all lines.

When the signal charges have been read out from all lines, image data of a frame of x-ray image is stored in the memory 56. The stored image data is then processed for various kinds of image rendering such as offset correction for eliminating offset components that are fixed pattern noises resulted from individualities of the FPD 36 or environmental factors and sensitivity correction for compensating for variations in output performance of the signal processing circuit 40. Thereafter, the image data is read out from the memory 56 to be output to the image acquisition controller 23 and transmitted to the console 24. Thus the x-ray image of the test subject H is detected.

The FPD 36 is configured to detect the timing of radiation from the x-ray source 13 without any synchronizing signal from the x-ray source 13. As shown by hatching in FIG. 2, the FPD 36 includes a short-circuited pixel 62 in the imaging area 38 as a detecting element for detecting the start and stop of x-ray radiation from the x-ray source 13. The short-circuited pixel 62 has substantially the same structure as other pixels 37, having a photodiode 42 and a TFT 43, such that the photodiode 42 generates signal charges corresponding to the incident amount of x-rays.

The difference between the short-circuited pixel 62 and other pixels 37 is in that the source of the TFT 43 of the short-circuited pixel 62 is short-circuited to its drain so that the TFT 43 of the short-circuited pixel 62 has lost the switching function. While the ordinary pixels 37 are electrically connected to or disconnected from the signal lines 48 by switching their TFTs 43 on or off, the short-circuited pixel 62 is kept connected to the signal line 48. As a result, the signal charges generated from the photodiode 42 of the short-circuited pixel 62 will continuously flow out through the signal line 48 into the corresponding integrating amplifier 49. Instead of short-circuiting the source and the drain of the TFT 43 in the short-circuited pixel 62, the short-circuited pixel 62 may be constructed by connecting its photodiode 42 directly to the signal line 48 without the TFT 43.

Based on the output from the short-circuited pixel 62, the controller 41 measures the intensity of x-rays radiated from the x-ray source 13 and irradiating the FPD 36 (the radiation dose per unit time), to monitor a change in the x-ray intensity. The controller 41 selects the integrating amplifier 49 that is fed with the signal charges from the short-circuited pixel 62, and reads out the voltage signal from the selected integrating amplifier 49 as an output voltage Vout of the short-circuited pixel 62. Each time the controller 41 reads out the output voltage Vout, the controller 41 resets the integrating amplifier 49. During the charge accumulating operation, the controller 41 repeats the reading operation for the output voltage Vout at very short intervals as compared to the entire x-ray irradiation time, in order to monitor the change in intensity of x-rays from the x-ray source 13.

The controller 41 converts the output voltage Vout to digital data and records the digital data in the memory 56. Based on the change with time in the output voltage Vout as recorded in the memory 56, the controller 41 monitors the change in intensity of incident x-rays, to detect the start and stop of x-ray radiation from the x-ray source 13.

Figure 3:
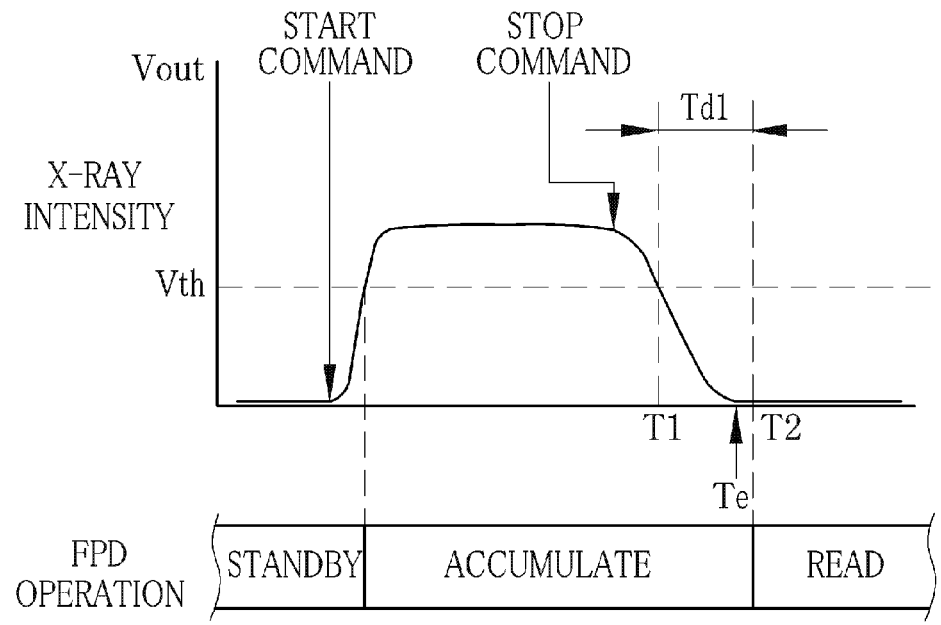
FIG. 3 is an explanatory diagram illustrating a timing chart for controlling the flat panel detector at a low tube voltage according to a first embodiment.

As shown in a graph of FIG. 3, illustrating a curve of x-ray intensity (the output voltage Vout) along axis, the intensity of x-rays dosed for one image acquisition changes in the form of a trapezoidal time curve. Upon the activation switch 15 being operated to send a radiation start command to the x-ray source 13, the x-ray source 13 starts x-ray radiation, so that the intensity of x-rays begins to gradually increase. Once the x-ray intensity goes up to a peak level that is determined according to the tube current given as one imaging condition, the x-ray intensity is kept in a stable range around the peak level till the x-ray source 13 receives a radiation stop command. The radiation stop command is applied from the x-ray source controller 14 to the x-ray source 13 when the irradiation time given as another imaging condition is over. Upon the radiation stop command, the x-ray source 13 starts decreasing the x-ray intensity gradually to zero.

The controller 41 switches the FPD 36 to the standby mode when it receives the standby command. In the standby mode, the controller 41 controls the FPD 36 to make the resetting operation. Also in the standby mode, the controller 41 measures the x-ray intensity on the basis of the output voltage Vout, which corresponds to the signal charges generated from the short-circuited pixel 62, and monitors changes in the x-ray intensity by comparing the output voltage Vout with a predetermined threshold level Vth. When the output voltage Vout goes above the threshold level Vth, the controller 41 determines that the x-ray source 13 starts x-ray radiation.

Upon detecting the start of x-ray radiation, the controller 41 turns off the TFTs 43 of the pixels 37 to move from the standby mode to the accumulating operation. As the TFTs 43 are off, the pixels 37 accumulate signal charges corresponding to the incident amounts of x-rays. While the TFTs 43 of the pixels 37 are off, the short-circuited pixel 62 remains being short-circuited to the signal line 48, so that the controller 41 continues monitoring the x-ray intensity based on the output voltage Vout from the short-circuited pixel 62. When the x-ray source 13 receives the stop command, the x-ray intensity begins to decrease. When the output voltage Vout gets down to the threshold level Vth or less, the controller 41 determines that the x-ray intensity began to decrease, thereby detecting an end of x-ray radiation.

Since the photodiode 42 generates dark current regardless of whether the photodiode 42 are irradiated with x-rays or not, a fraction of the output voltage Vout of the short-circuited pixel 62 corresponds to the dark current. For this reason, the output voltage Vout will not completely get to "0" even while the short-circuited pixel 62 is not irradiated with x-rays. Because the voltage corresponding to the dark current is a noise that may cause an error in the detection of radiation timing, the threshold level Vth should be set at a high level enough for preventing against the influence of dark current noise.

The controller 41 also determines when to stop the accumulating operation and start the reading operation. Because of the slow response of the x-ray source 13 to the stop command, there is a certain time lag from when the x-ray intensity begins to decrease upon the stop command till the radiation completely stops, that is, when the x-ray intensity gets down to zero. A declivity in time curve of radiation intensity, representing the decreasing x-ray intensity after the stop command, may be referred to as radiation wave tail. Hereinafter, the time lag from when the x-ray intensity begins to decrease till it gets down to zero may be referred to as the duration of radiation wave tail, and the time point when the x-ray intensity becomes substantially zero will be referred to as the end-of-tail Te. In one embodiment, as shown in FIGS. 3 to 6, the controller 41 determines the time to start the reading operation depending on the gradient S of the radiation wave tail, i.e. the declivity in time curve of radiation intensity.

The gradient S of the radiation wave tail has a certain correlation with the tube voltage applied to the x-ray source 13. As shown for example in FIG. 3, the declivity gets steeper when the tube voltage is low. On the other hand, as shown for example in FIG. 4, the declivity gets gentler when the tube voltage is high. That is, the duration of radiation wave tail gets the longer, the higher is the tube voltage applied to the x-ray source 13. Accordingly, the end-of-tail Te will vary depending on the gradient S.

Figure 4:
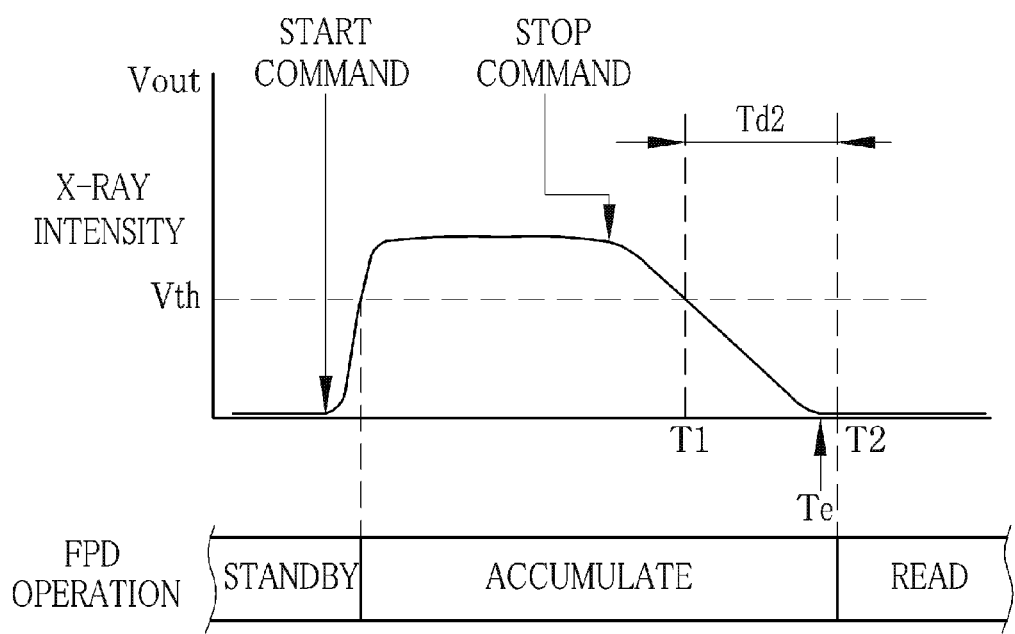
FIG. 4 is an explanatory diagram illustrating a timing chart for controlling the flat panel detector at a high tube voltage according to a second embodiment.

Therefore, depending on the gradient S, the controller 41 determines a delay time Td from the time T1 when the end of radiation is detected to the time T2 when the reading operation is started. Specifically, the delay time Td is made short when the gradient S is great and the duration of radiation wave tail is short (FIG. 3), whereas the delay time Td is made long when the gradient S is small and the duration of radiation wave tail is long (FIG. 4). Thereby, the controller 41 adjusts the time T2 to start the reading operation as close to the end-of-tail Te as possible even while the radiation wave tail lasts for a variable length.

More specifically, the controller 41 calculates the gradient S of the radiation wave tail, i.e. time derivative ($\Delta$Vout/$\Delta$t) of the output voltage Vout, at the time of end-of-radiation detection T1. The controller 41 decides the delay time Td depending on the calculated gradient S. Since the time lag from the end-of-radiation detection T1 till the end-of-tail Te gets longer as the gradient S gets smaller, the controller 41 sets the delay time Td the longer for the smaller gradient S.

In this embodiment, the delay time is set at a value Td1 when the gradient S is great (the tube voltage is low), as shown in FIG. 3, and the delay time is set at a value Td2 longer than the value Td1 when the gradient S is small (the tube voltage is high), as shown in FIG. 4.

Figure 5:
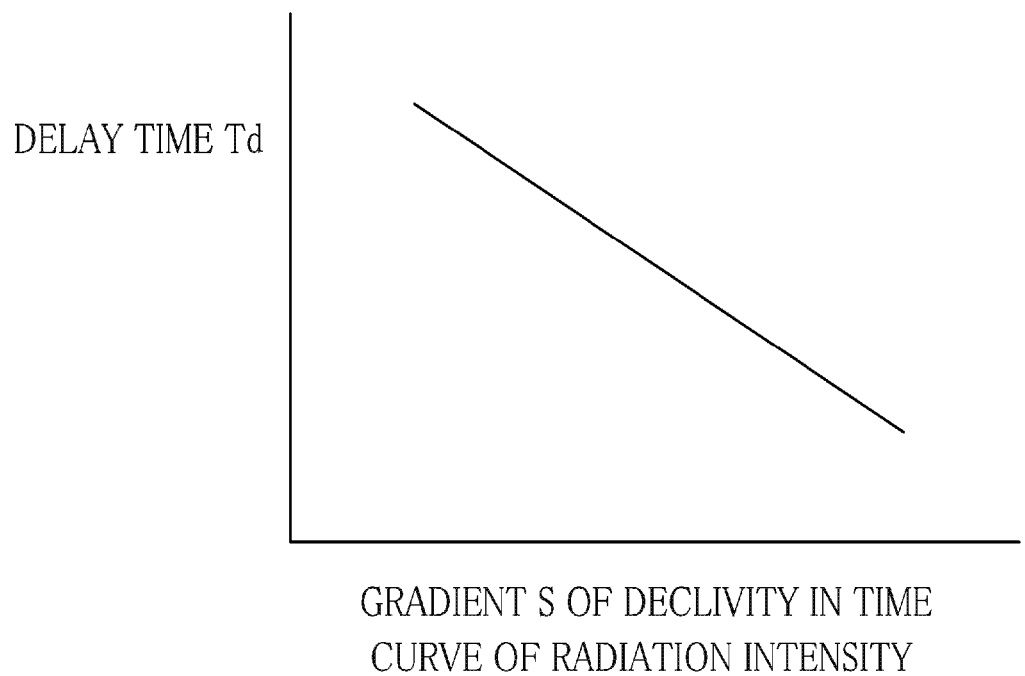
FIG. 5 is a graph illustrating a correlation between the gradient of declivity in time curve of radiation intensity and delay time.

The memory 56 stores a data table recording a correlation between the gradient S and the delay time Td, as shown in FIG. 5. The controller 41 refers to the memory 56 to read out the delay time Td corresponding to the calculated gradient S from the data table. The controller 41 also begins to count the time from the end-of-radiation detection T1 in order to terminate the accumulating operation and start the reading operation at the time T2 when the delay time Td has elapsed since the end-of-radiation detection T1.

The correlation between the delay time Td and the gradient S may be determined by changing the tube voltages to the x-ray source 13 to change the gradient S of declivity or radiation wave tail of the x-ray intensity curve, while measuring variations in duration of the radiation wave tail, and setting up appropriate delay times Td based on the measured variable durations of the radiation wave tail. Then, the set delay times Td may be recorded as table data in combination with the corresponding gradients S. This table data may be calibrated in the factory and at regular maintenance checkups. Because the characteristic curve of the radiation wave tail may differ from one radiation source to another, the table data in the memory 56 should preferably be revisable at each calibration.

The overall operation of the x-ray radiography system 10 configured as above will be described with reference to the flowchart of FIG. 6. First a target site of the subject H and the irradiation field of the x-ray source 13 are positioned and adjusted to the electronic cassette 21 mounted in the radiographic stand 22. Then, image acquisition settings, such as tube voltage, tube current, and irradiation time, are determined. Upon receipt of a standby command, the controller 41 of the electronic cassette 21 sets the FPD 36 to the standby mode (step: S101). Then the FPD 36 starts the resetting operation and the x-ray intensity measurement (S102). Thus the output voltage Vout corresponding to the output from the short-circuited pixel 62 begins to be recorded in the memory 56.

When the activation switch 15 is turned on to input a start command to the x-ray source 13, the x-ray source 13 starts x-ray radiation toward the subject H. Meanwhile, the FPD 36 compares the output voltage Vout with the threshold level Vth to monitor the change in x-ray intensity (S103). When the x-ray intensity increases so much that the output voltage Vout gets above threshold level Vth, the FPD 36 detects the start of x-ray radiation (S104), upon which the FPD 36 turns off the TFTs 43 of the pixels 37 to start the accumulating operation (S105).

The FPD 36 continues monitoring the change in x-ray intensity through comparison of the output voltage Vout with the threshold level Vth (S106). When the irradiation time given as one imaging condition is over, a stop command is fed to the x-ray source 13 so that the x-ray intensity begins to decrease. When the output voltage Vout gets down to the threshold level Vth or less, the FPD 36 determines that the x-ray intensity begins to decrease, detecting an end of radiation (S107).

Then the FPD 36 calculates the gradient S of the declivity of the measured x-ray intensity at the time T1 when the end of radiation was detected (S108). Based on the gradient S, the FPD 36 determines the delay time Td from the end-of-radiation detection T1 to the reading start time T2. The delay time Td is set at a shorter value (Td1) for a greater gradient S (at a lower tube voltage), or a longer value (Td2) for a smaller gradient S (at a higher tube voltage).

The FPD 36 begins to count the time from the end-of-radiation detection T1 up to the set delay time Td (S110), and terminates the accumulating operation and start the reading operation at the time T2 when the delay time Td has elapsed since the end-of-radiation detection T1 (S111). The x-ray image or radiographic data readout through the reading operation is stored in the memory 56 and then transmitted to the console 24.

Determining the reading start time T2 depending on the gradient S of the radiation wave tail can make the reading start time T2 as close to the end-of-tail Te as possible, at which the output voltage Vout corresponding to the x-ray intensity becomes substantially zero. To the contrast, if the reading operation is started in a constant delay time from the end-of-radiation detection regardless of the variable duration of the radiation wave tail, like in the prior art, the reading start time can undesirably deviate from the complete end of radiation.

If the accumulating operation is terminated to start the reading operation at the beginning of declination of the x-ray intensity, e.g. at the end-of-radiation detection T1, those x-rays incident after the start of reading operation will not be utilized for detecting the image signal. This is a waste of radiated x-rays, reducing the accumulated amount of signal charges and lowering S/N ratio of the consequent x-ray image. In addition, the x-rays incident during the reading operation may cause the shading artifact in the image. On the other hand, if the accumulating operation continues after the end-of-tail Te when the x-ray intensity gets down to zero, the dark current noise in the image signal will increase so much that the S/N ratio of the x-ray image will be worsened.

According to the present invention, the reading start time T2 may be set closer to the end-of-tail Te in spite of the variable duration of the radiation wave tail. Thus, the S/N ratio of the consequent x-ray image will be improved. There has been an increasing demand for acquiring high quality x-ray images with minimum radiation doses onto the patients. The present invention, achieving higher S/N ratio, will also satisfy this requirement.

Setting the threshold level Vth for detecting the end of radiation at a higher level and starting the reading operation in the delay time Td from the end-of-radiation detection T1 make it possible to decide the time to start the reading operation independently of the output voltage Vout after the end-of-radiation detection T1. Accordingly, it is unnecessary to monitor the output voltage Vout in the low level range. This is effective to prevent false detection of the end of radiation, which might be caused by the dark current noise, and also avoid elongating the time taken for detecting the end of radiation.

While the correlation between the gradient S and the delay time Td is stored as table data, the memory 56 may store a factor representative of the correlation shown in FIG. 5, so that the delay time Td may be calculated from the gradient S using this factor. The delay time Td may also be selected at least between two options depending on whether the gradient S is less than a reference level or not.

In order to improve the S/N ratio while preventing the shading artifact, the delay time Td should preferably be such a short length that the reading start time T2 comes short after the end-of-tail Te. If the reading start time T2 is earlier than the end-of-tail Te, the shading artifact will occur in the x-ray image. However, for the sake of S/N ratio improvement, the time lag from the end-of-tail Te to the reading start time T2 should preferably be as short as possible. The reason is as set forth below.

Since the dark current continues being generated in the pixels 37 during the accumulating operation, the dark current noise will be accumulated in addition to the signal charges that are due to the incident x-rays. As the x-ray intensity decreases, the ratio of the dark current noise to the signal charges increases, and when the x-ray intensity gets down to zero, the outputs of the pixels finally represent the dark current noise alone. Therefore, continuing the accumulating operation after the end of irradiation will just increase the dark current noise. For this reason, unless the reading start time T2 comes before the end-of-tail Te, it is preferable to make the delay time Td as short as possible in order to improve the S/N ratio and prevent the shading artifact as well.

It is to be noted that the start of radiation may be detected with reference to a different threshold level from that used for detection of the end of radiation, while the same threshold level Vth is used for detecting both the start and the end of radiation in the above embodiment.

Second Embodiment

Figure 6:
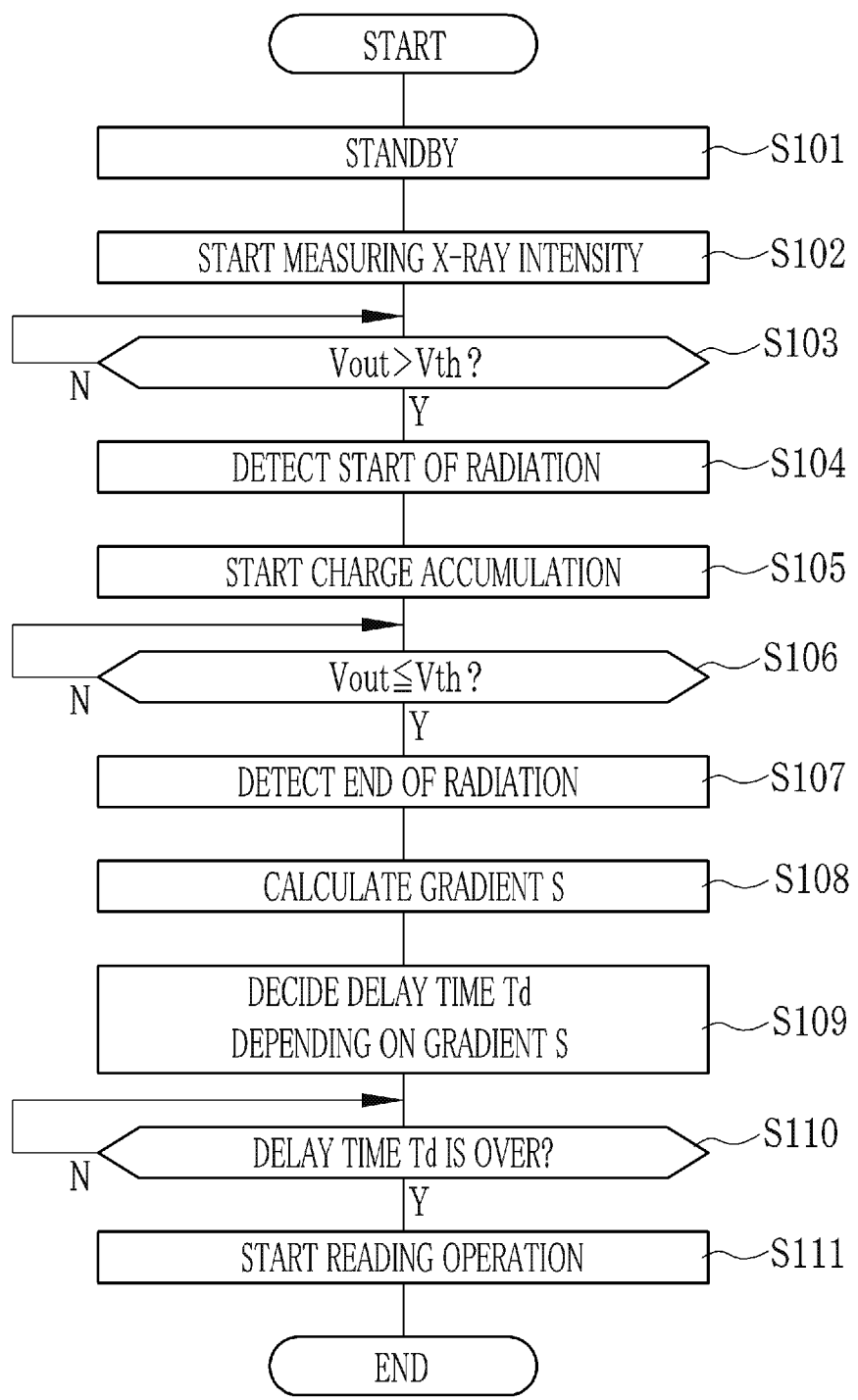
FIG. 6 is a flowchart illustrating a control sequence for the flat panel detector according to the first embodiment.
Figure 7:
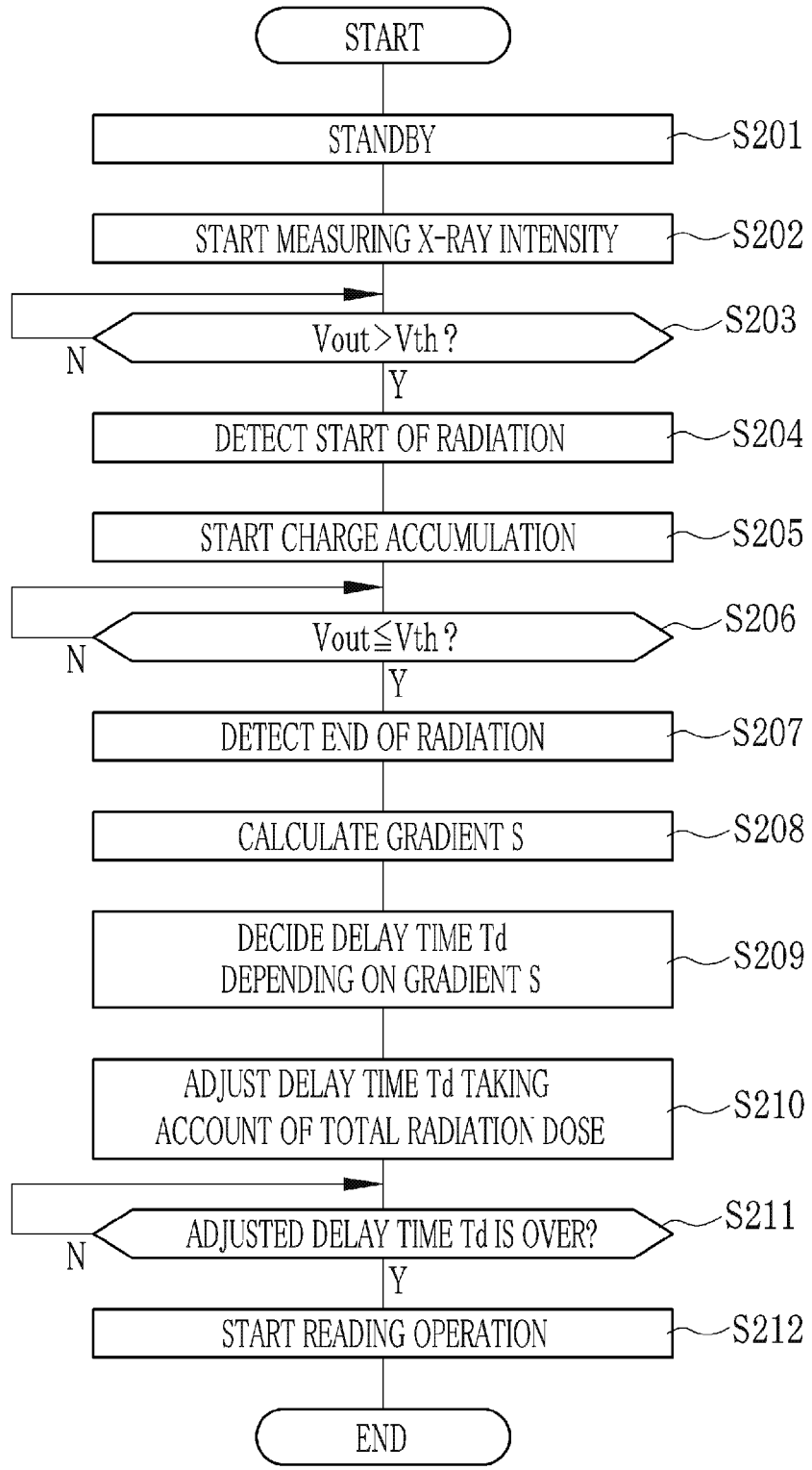
FIG. 7 is a flowchart illustrating a control procedure for the flat panel detector according to a second embodiment.
Figure 8:
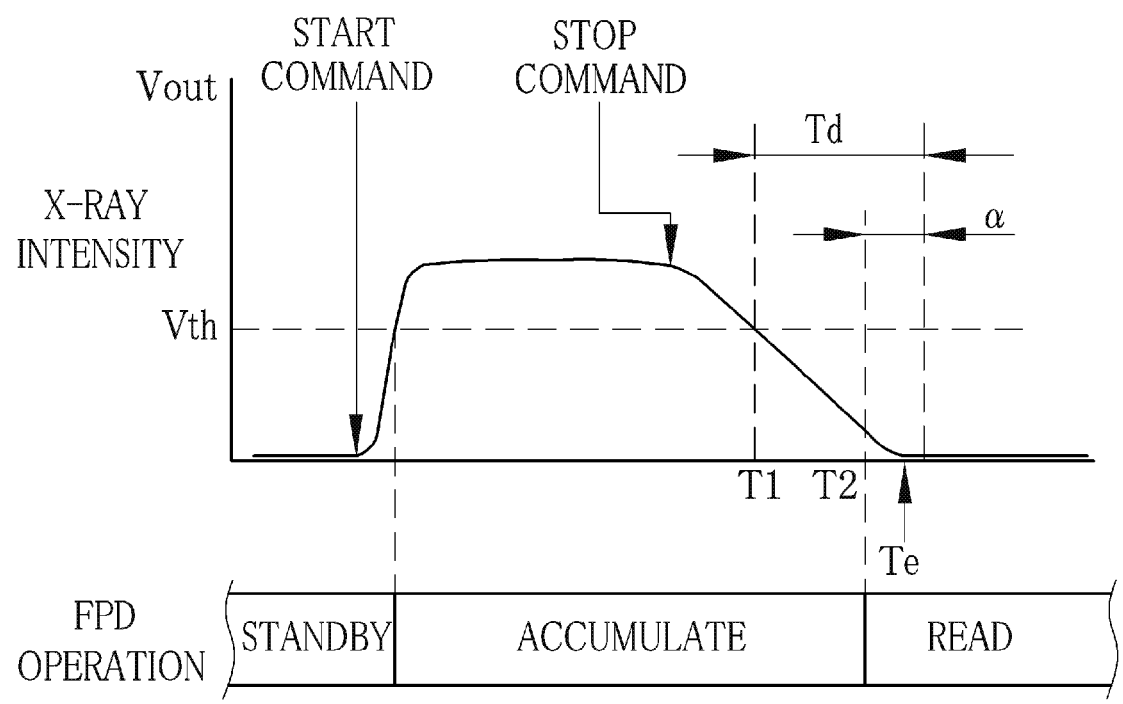
FIG. 8 is an explanatory diagram illustrating a control procedure according to the second embodiment.

In a second embodiment as shown in FIGS. 6 and 8, the delay time Td may be adjusted according to the total radiation dose (S210), i.e. the total irradiation amount of x-rays, after determining the delay time Td depending on the gradient S of the declivity of the x-ray intensity curve (S209). Note that the flowchart of FIG. 7 is equal to that of FIG. 6 except the additional step S210 for adjusting the delay time Td.

Referring to FIG. 8, a specific example of adjusting the delay time Td is illustrated, wherein the delay time Td determined by the gradient S is adjusted by subtracting an adjustment value $\alpha$ therefrom when the total radiation dose is greater than a certain amount. That is, in case of a greater total radiation dose, the reading start time T2 is set ahead of the time determined by the non-adjusted delay time Td. In that case, the reading start time T2 may come before the end-of-tail Te. However, because the percentage of radiation dose during the wave tail to the total radiation dose gets smaller as the total radiation dose increases, S/N ratio of the acquired image tends to be more improved by shortening the delay time Td to reduce the affection of the dark current noise on the image than making full use of the radiation dose including the dose during the wave tail. In addition, when the total radiation dose is great enough, the shading artifact will be less conspicuous even if it occurs in the acquired image.

On the contrary, when the total radiation dose is small, the adjustment value $\alpha$ is added to the delay time Td determined by the gradient S. Thus, the delay time is elongated and the reading start time T2 is set behind the time determined by the non-adjusted delay time Td. This will reduce the waste of radiation. However, as described above, concerning the dark current noise, the reading start timing T2 should not preferably come long after the end-of-tail Te. Therefore, the adjustment value α should preferably be determined in such a range that the reading start time T2 will not greatly delayed from the end-of-tail Te when the delay time Td is elongated by the adjustment value α.

The total radiation dose may be determined as an integrated value of the x-ray intensity curve. The controller 41 calculates the total radiation dose based on the history of the output voltage Vout recorded in the memory 56. The total radiation dose may also be approximated by "mAs value", the product of tube current (mA) and irradiation time (s). Accordingly, the total radiation dose may be calculated by multiplying the tube current by the irradiation time, both being given as image acquisition settings. In replace of the total radiation dose, the peak level of the x-ray intensity may be used for determining the adjustment value α. If the irradiation time is constant, the total radiation dose is proportional to the peak x-ray intensity.

Third Embodiment

Figure 9:
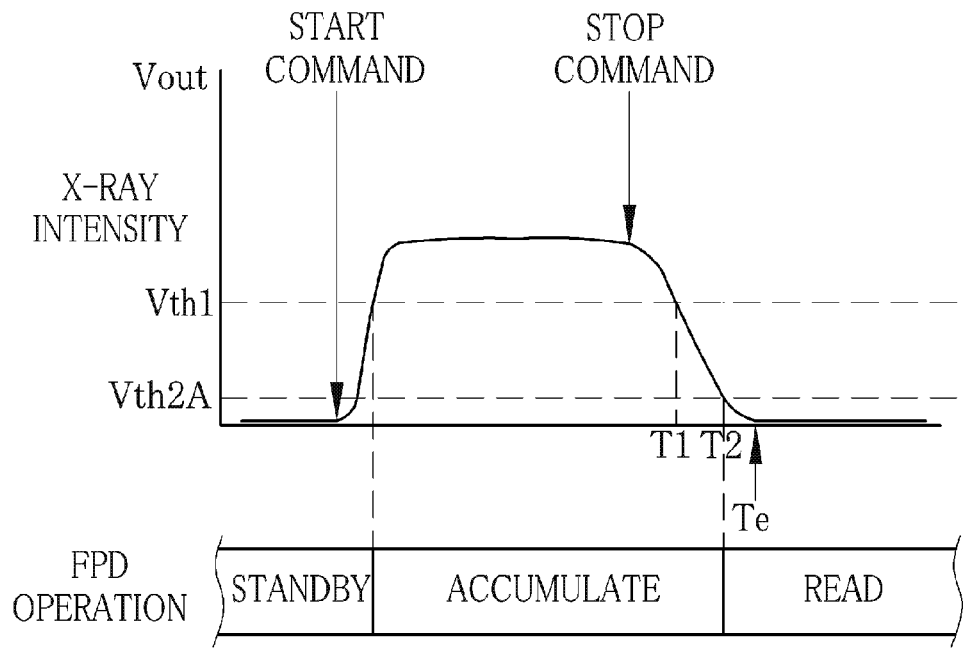
FIG. 9 is an explanatory diagram illustrating a control procedure at a low tube voltage according to a third embodiment.
Figure 10:
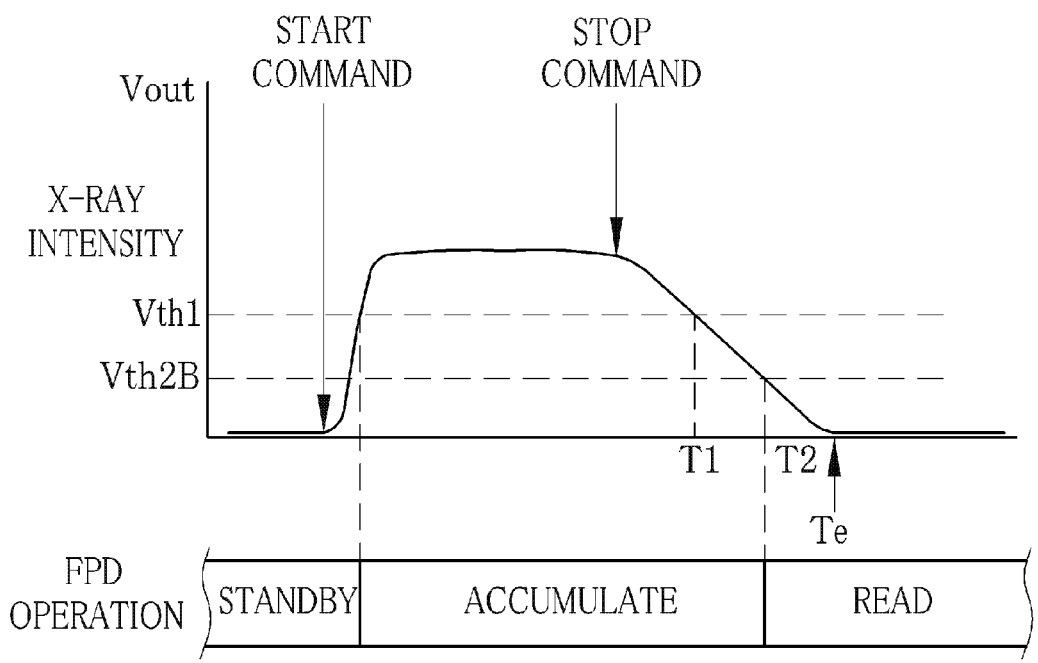
FIG. 10 is an explanatory diagram illustrating a control procedure at a high tube voltage according to the third embodiment.
Figure 11:
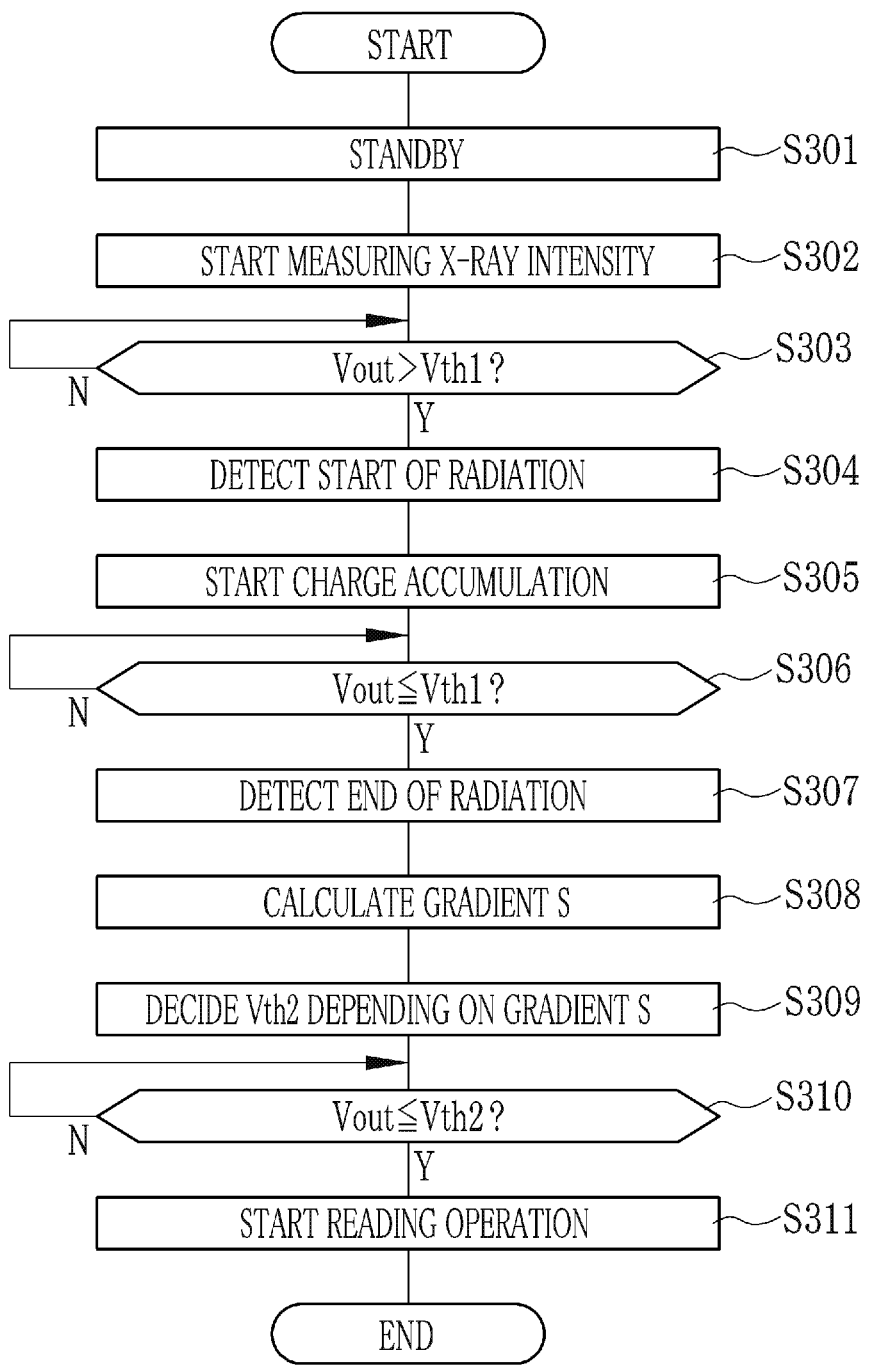
FIG. 11 is a flowchart illustrating a control sequence for the flat panel detector according to the third embodiment.

In the above embodiments, the delay time Td from the end-of-radiation detection time T1 to the reading start time T2 is determined based on the gradient S of declivity of the x-ray intensity curve at the end-of-radiation detection time T1. In an alternative embodiment, as shown in FIGS. 9 to 11, the reading start time T2 may be determined through comparison of the output voltage Vout with a second threshold level Vth2 that is lower than a first threshold level Vth1 used for detecting an end of radiation. The second threshold level Vth2 may be decided by the gradient S of the x-ray intensity curve at T1 when the end of radiation is detected through comparison of the output voltage Vout with the first threshold level Vth1.

The flowchart of FIG. 11, illustrating the control sequence according to the third embodiment, is fundamentally equal to the flowchart of FIG. 6, except steps 309 and 310. As shown in FIG. 11, the controller 41 monitors the output voltage Vout and detects the end of radiation when the output voltage Vout gets below the first threshold level Vth1 (S307), judging that the x-ray intensity began to decrease. Then the controller 41 measures the gradient S at the end-of-radiation detection time T1 (S308), and determines the second threshold level Vth2 depending upon the gradient S. When the output voltage Vout gets down to the second threshold level Vth2 or less, the controller 41 controls the FPD 36 to start the reading operation (S311).

As shown in FIG. 9, when the gradient S is great (the tube voltage is low), the duration of radiation wave tail is short and the time lag from the stop command to the end-of-tail Te is short. In that case, the second threshold level Vth2 for determining the reading start time T2 is set at a low level Vth2A. With the short time lag, the reading start time T2 will less deviate from the end-of-tail Te even if the reading start time T2 is incorrectly determined due to the dark current noise. Therefore, when the gradient S is great, the second threshold level Vth2 may be set at a low level so as to make the reading start time T2 as close to the end-of-tail Te as possible.

On the other hand, when the gradient is small (the tube voltage is high), the time lag from the stop command to the end-of-tail Te is long. In that case, if the second threshold level Vth2 is too low, the reading start time T2 may remarkably deviate from the end-of-tail Te if it is affected by the dark current noise. Therefore, when the gradient S is small, the second threshold level Vth2 may be set at a higher level Vth2B than the second threshold level Vth2A for the greater gradient S (lower tube voltage).

In addition to the above configuration, the controller 41 may count the time from the end-of-radiation detection time T1 and start the reading operation in a predetermined time from the end-of-radiation detection time T1 if the output voltage Vout does not get down to the second threshold level Vth2 within the predetermined time.

It is also possible to adjust the second threshold level Vth2 according to the total radiation dose or the peak x-ray intensity, like the delay time Td adjusted in the second embodiment.

Other Embodiments

While the reading start time T2 is determined according to the gradient S of declivity of the x-ray intensity curve at the end-of-radiation detection time T1 in the first embodiment, it is possible to determine the reading start time T2 according to the gradient of acclivity of x-ray intensity curve at the begging of radiation. As set forth above, the gradient S of declivity correlates with the tube voltage applied to the x-ray source 13. Also the gradient of acclivity varies depending on the tube voltage. Therefore, the gradient of acclivity correlates with the gradient S of declivity. Accordingly, it is possible to estimate the gradient S of declivity of the x-ray intensity curve from the gradient of acclivity of x-ray intensity curve, instead of measuring the gradient S of declivity from actual change in x-ray intensity, and decide the reading start time T2 by the estimated gradient S.

In this embodiment, a correlation between the gradient of acclivity and the delay time Td or the second threshold level Vth2 may be previously stored as table data in the memory 56. The controller 41 monitors change in x-ray intensity at the begging of radiation and calculate the gradient of acclivity of the increasing x-ray intensity. According to the calculated gradient of acclivity, the controller 41 reads out the delay time Td or the second threshold level Vth2 from the data table of the memory 56, to decide the reading start time T2.

Since there is a correlation between the tube voltage and the gradient S of declivity, it is possible to estimate the gradient S of declivity from the tube voltage that is given as one imaging condition from the console 24, instead of measuring the gradient S of declivity from actual change in x-ray intensity. Then the reading start time T2 may be decided by the estimated gradient S. In that case, a correlation between the tube voltage and the delay time Td or the second threshold level Vth2 may be previously stored as table data in the memory 56. Then the controller 41 may decide the reading start time T2 according to the tube voltage with reference to the table data.

However, actually measuring the gradient S of declivity, like in the above first to third embodiments, is preferred to estimating the gradient S of declivity from the gradient of acclivity or the tube voltage. This is because the gradient S of declivity may vary depending upon the type of x-ray source even at the same tube voltage. Moreover, even with the same kind of x-ray source at the same tube voltage, the gradient S of declivity may change due to aging of the x-ray source. Furthermore, the x-ray source may be selectively provided with a filter for modifying the quality of radiated x-rays, such as a filter cutting a fraction of energy spectrum (e.g. a low energy range) of the x-rays, according to the target site to be imaged. When such a filter is used, the gradient S of declivity can change with the change in quality of the filtered x-rays. For these reasons, it is difficult to precisely estimate the actual gradient S of declivity from the gradient of acclivity or the tube voltage, even though they correlate with the gradient S of declivity. Accuracy of the estimated gradient is therefore inferior to the actually measured gradient S of declivity. Therefore, it is more preferable to actually measure the gradient S of declivity, like in the above first to third embodiments.

In such a radiographic image detector as the electronic cassette 21 of the above embodiment that does not communicate with the x-ray source 13, neither the synchronizing signal nor image acquisition settings are exchanged between the x-ray source 13 and the radiographic image detector. Accordingly the radiographic image detector like the above electronic cassette 21 cannot obtain data on the tube voltage actually set in the x-ray source 13. For this type radiographic image detector, the method of determining the reading start time based on the measured actual gradient S of declivity is suitable.

In the above embodiment, the x-ray intensity is measured by the short-circuit pixel that is placed in the imaging area. The short-circuit pixel has approximately the same structure and sensitivity to x-rays as other ordinary pixels, so that the intensity of x-rays incident in the imaging area may be measured precisely enough to detect the start and stop of radiation with sufficient accuracy. Having approximately the same structure, the short-circuit pixel can be fabricated with ease without much increase in the production cost.

Figure 12:
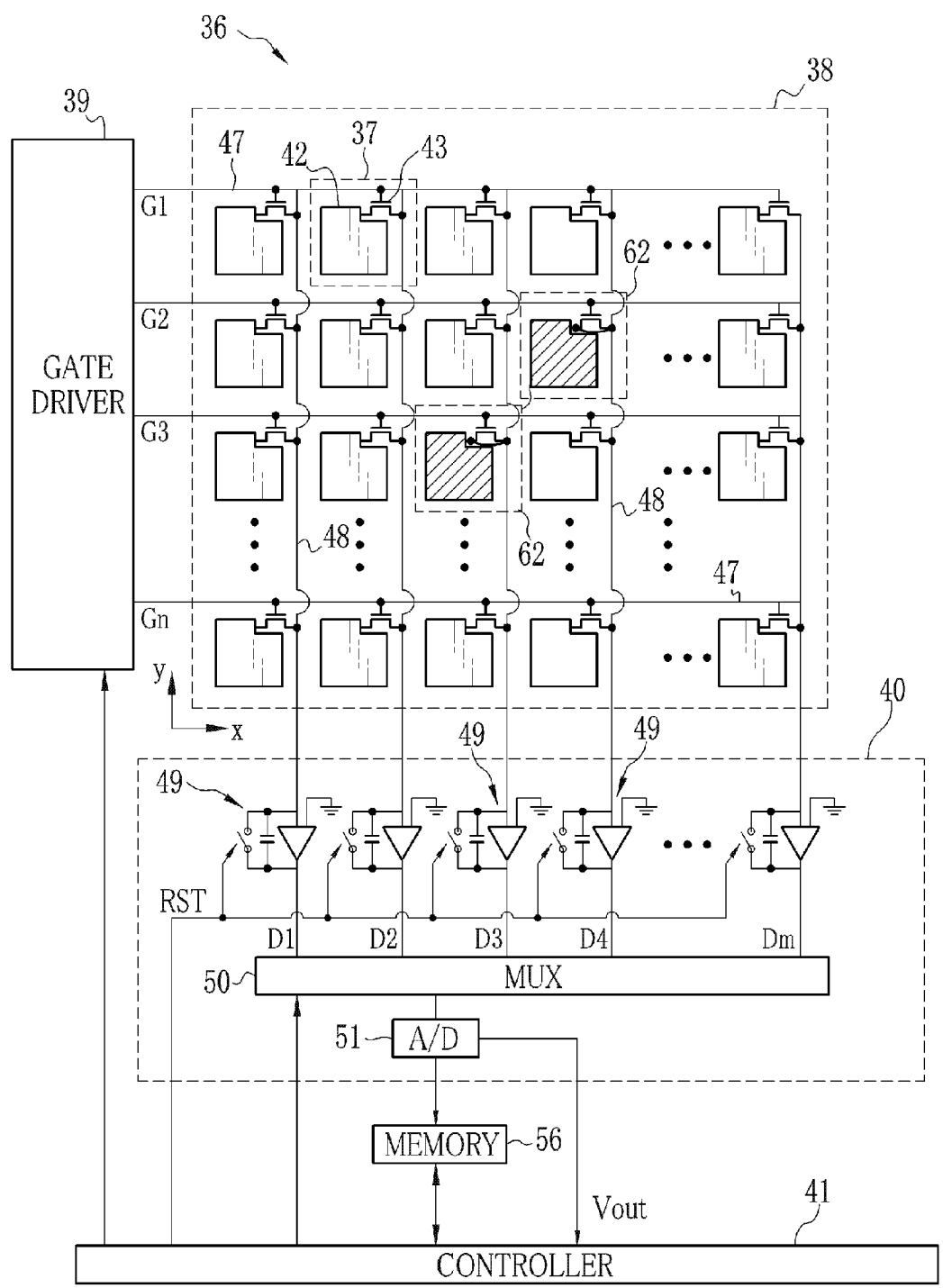
FIG. 12 is a circuit diagram illustrating an electric structure of a flat panel detector provided with multiple short-circuited pixels.

Although the above embodiments have been described with reference to an example where the FPD 36 is provided with one short-circuit pixel 62, it is possible to provide multiple short-circuit pixels 62, like as shown in FIG. 12. In that case, it is preferable to monitor output voltages Vout on those signal lines 48 which are connected with the respective short-circuit pixels 62, and select one signal line 48 providing the highest output voltage Vout from among these signal lines 48. The highest output voltage Vout means the highest radiation dose on the short-circuited pixel 62 that is connected to the selected signal line 48. Using the output voltage Vout from the short-circuited pixel 62 of the highest dose, the x-ray intensity may be measured with high accuracy. Therefore, the end of radiation as well as the gradient of declivity of the decreasing x-ray intensity may preferably be determined based on the output voltage Vout of the selected signal line 48.

The x-ray intensity may also be measured by other devices than the short-circuit pixel or pixels. For example, bias currents flowing through the bias lines may be detected for the x-ray intensity measurement, because the magnitude of the bias currents changes with the signal charges generated in the photodiodes of the pixels, even while the bias voltage applied to the photodiodes is constant. Alternatively, leak currents flowing through the signal lines while the TFTs of the pixels are off may be detected for the x-ray intensity measurement, because the magnitude of the leak currents also change with the signal charges generated in the photodiodes of the pixels.

While the present invention has been described with reference to the TFT type FPD, wherein the TFTs are formed in a matrix on a glass substrate, the present invention is applicable to other types of FPDs, such as those having CMOS image sensor elements or CCD image sensor elements formed on a semiconductor substrate. Among others, using the CMOS image sensor has the following advantages:

In the CMOS image sensor, it is unnecessary to discharge the signal charges from the pixels to the signal lines for the sake of measuring the accumulated amounts of the signal charges. Instead, so-called non-destructive reading is possible; the signal charges may be read as voltage signals through amplifiers provided for the respective pixels. Accordingly, it is possible to measure the signal charges accumulated in any pixel in the imaging area, selected for the x-ray intensity measurement, even in the middle of the accumulating operation. Therefore, the x-ray intensity may be measured through any of ordinary pixels of the CMOS image sensor, without the need for a specific pixel like the above short-circuited pixel.

It should be understood that the embodiments of the present invention have been disclosed for illustrative purposes only. Those skilled in the art will appreciate that various modifications, additions and substitutions are possible without departing from the scope and spirit of the invention as disclosed in the accompanying claims.

The radiographic image detector of the present invention is applicable not only to a stationary type radiography system that is installed in an x-ray room of a hospital, but also to other types of radiography system, such as a type boarded on a round-visit car, or a portable system that may be carried around for emergency medical care at accident sites or disaster sites or for home medical care.

In the above embodiment, the electronic cassette as a radiographic image detector and the image acquisition controller are configured as separate units. The image acquisition controller may also be integrated into the electronic cassette, for example, by incorporating the function of the image acquisition controller into the controller of the electronic cassette.

Although the present invention has been described with reference to the electronic cassette as a portable radiographic image detector, the present invention is applicable to a stationary radiographic image detector.

Moreover, the present invention is applicable not only to x-ray radiography systems but also to other radiography systems using other kinds of radioactive rays like gamma-rays.

What is claimed is:

1. A radiographic image detector for detecting a radiographic image from radioactive rays projected from a radiation source, the radiographic image detector comprising:
    an imaging device having pixels arrayed in a matrix, each pixel generating an electric signal corresponding to the amount of radioactive ray incident on the pixel;
    a measuring device measuring radiation intensity that represents radiation dose per unit time of the incident radioactive rays;
    a detection device detecting an end of radiation from the radiation source on determining that the measured radiation intensity began to decrease;
    a timing device for deciding reading start time to start a reading operation for reading out the electric signals from the pixels as radiographic image data such that an interval between detection of the end of radiation and start of the reading operation is variable, on the basis of a gradient of a declivity in time curve of the radiation intensity decreasing in the end of radiation; and
    a control device for controlling the imaging device to stop accumulating the electric signals and start the reading operation at the reading start time decided by the timing device after the end of radiation is detected by the detection device.

2. The radiographic image detector of claim 1, wherein the timing device calculates the gradient of the declivity in the time curve from the radiation intensity measured by the measuring device, and decides the time to start the reading operation depending on the calculated gradient.

3. The radiographic image detector of claim 2, wherein the timing device calculates the gradient of the declivity in the time curve at an end-of-radiation detection time when the detection device detects the end of radiation.

4. The radiographic image detector of claim 1, wherein the detection device determines that the radiation intensity began to decrease when the measured radiation intensity decreases to a first threshold level or less.

5. The radiographic image detector of claim 4, wherein the timing device decides a delay time from the end-of-radiation detection time to the time to start the reading operation depending on the gradient, and the control device controls the imaging device to start the reading operation when the delay time has elapsed since the end-of-radiation detection time.

6. The radiographic image detector of claim 5, wherein the timing device adjusts the delay time on the basis of total radiation dose or peak intensity of the incident radioactive rays.

7. The radiographic image detector of claim 4, wherein the timing device decides a second threshold level lower than the first threshold level depending on the gradient, and the control device controls the imaging device to start the reading operation when the radiation intensity decreases to the second threshold level or less.

8. The radiographic image detector of claim 7, wherein the timing device adjusts the second threshold level on the basis of total radiation dose or peak intensity of the incident radioactive rays.

9. The radiographic image detector of claim 1, wherein the timing device estimates the gradient of the declivity in the time curve of the radiation intensity from information that correlates with the gradient of the declivity in the time curve of the radiation intensity, and decides the time to start the reading operation on the basis of the estimated gradient.

10. The radiographic image detector of claim 9, wherein the information correlating with the gradient of the declivity in the time curve is a gradient of an acclivity in the time curve of the radiation intensity increasing as the radiation source starts radiation.

11. The radiographic image detector of claim 9, wherein the information correlating with the gradient of the declivity in the time curve is information on tube voltage applied for activating the radiation source.

12. The radiographic image detector of claim 1, wherein the pixels of the imaging device include at least a short-circuited pixel that is kept electrically connected to a signal line for reading out the electric signal from the pixel, and the measuring device monitors output level of the short-circuited pixel through the signal line to measure the radiation intensity.

13. The radiographic image detector of claim 12, wherein two or more of the pixels are constructed as the short-circuited pixels connected to individual signal lines, wherein
the measuring device selects one signal line with the largest output level for measuring the radiation intensity from among those signal lines connected to the short-circuited pixels.

14. A control method for a radiographic image detector for detecting a radiographic image from radioactive rays projected from a radiation source, the radiographic image detector having pixels arrayed in a matrix, each pixel accumulating an electric signal corresponding to the amount of radioactive ray incident on the pixel, the method comprising the steps of:
measuring radiation intensity that represents radiation dose per unit time of the radioactive rays incident on the radiographic image detector;
determining whether the measured radiation intensity began to decrease or not;
detecting an end of radiation from the radiation source when it is determined that the measured radiation intensity began to decrease;
determining a gradient of a declivity in time curve of the radiation intensity decreasing in the end of radiation;
deciding on the basis of the gradient a reading start time to start reading the electric signals from the pixels as radiographic image data such that an interval between detection of the end of radiation and start of the reading operation is variable; and
stopping accumulating the electric signals in the pixels and starting reading the electric signals from the pixels at the decided reading start time.

* * * * *